United States Patent
Ye et al.

(10) Patent No.: US 8,234,291 B2
(45) Date of Patent: Jul. 31, 2012

(54) METHOD AND SYSTEM FOR DETERMINING JUNK INFORMATION

(75) Inventors: Jingjun Ye, Zhejiang (CN); Xiaolong Ma, Zhejiang (CN); Congzhi Wang, Zhejiang (CN); Hao Wang, Zhejiang (CN)

(73) Assignee: Alibaba Group Holding Limited, Grand Cayman (KY)

( * ) Notice: Subject to any disclaimer, the term of this patent is extended or adjusted under 35 U.S.C. 154(b) by 72 days.

(21) Appl. No.: 12/445,574

(22) PCT Filed: Sep. 25, 2007

(86) PCT No.: PCT/CN2007/070764
§ 371 (c)(1),
(2), (4) Date: Apr. 14, 2009

(87) PCT Pub. No.: WO2008/046338
PCT Pub. Date: Apr. 24, 2008

(65) Prior Publication Data
US 2010/0094887 A1    Apr. 15, 2010

(30) Foreign Application Priority Data
Oct. 18, 2006  (CN) .......................... 2006 1 0152807

(51) Int. Cl.
*G06F 7/00* (2006.01)
(52) U.S. Cl. ....................................... 707/758
(58) Field of Classification Search .......... 707/758, 707/754; 709/224, 206; 715/531
See application file for complete search history.

(56) References Cited

U.S. PATENT DOCUMENTS 6,161,130 A   12/2000  Horvitz et al.
6,199,103 B1   3/2001  Sakaguchi et al.
(Continued)

FOREIGN PATENT DOCUMENTS

CN    1196103 A    10/1998
(Continued)

OTHER PUBLICATIONS

"Bayesian Spam Filtering", Wikipedia, retrieved on Dec. 9, 2011 at http://en/wikipedia.org/wiki/Bayesian_spam_filtering, 8 pgs.

(Continued)

*Primary Examiner* — Hung T Vy
*Assistant Examiner* — Mongbao Nguyen
(74) *Attorney, Agent, or Firm* — Lee & Hayes, PLLC

(57) ABSTRACT

The present invention is a method and a system for determining junk information related to the fields of information filtering, and can solve the problem of improperly predefined junk information. The method includes: pre-defining junk information keywords in data samples; computing keyword scores for each of the keywords; simulating filtering of the data samples using the keyword scores to obtain a filtering index value; determining whether the filtering index value satisfies an evaluation index; if not satisfied, revising the keywords or the keyword scores and repeating the simulating to obtain a new filtering index value; and if satisfied, terminating the revising. The disclosed method can help a user more reasonably define junk information keywords and keyword scores, and determine whether information is junk information based on the keywords and corresponding scores, thereby improving efficiency of information filtering. The invention can be widely adopted in a variety of applications and systems such as feedback systems, guestbook systems, forums and junk mail processing.

19 Claims, 3 Drawing Sheets

U.S. PATENT DOCUMENTS

| | | | |
|---|---|---|---|
| 6,321,267 B1 * | 11/2001 | Donaldson | 709/229 |
| 6,421,709 B1 * | 7/2002 | McCormick et al. | 709/206 |
| 6,732,157 B1 * | 5/2004 | Gordon et al. | 709/206 |
| 7,051,077 B2 | 5/2006 | Lin | |
| 7,533,148 B2 | 5/2009 | McMillan et al. | |
| 7,617,285 B1 | 11/2009 | Hartmann | |
| 7,627,670 B2 | 12/2009 | Haverkos | |
| 2004/0064515 A1 | 4/2004 | Hockey | |
| 2004/0083270 A1 * | 4/2004 | Heckerman et al. | 709/207 |
| 2004/0145773 A1 * | 7/2004 | Oakeson et al. | 358/1.15 |
| 2004/0167964 A1 * | 8/2004 | Rounthwaite et al. | 709/206 |
| 2004/0210640 A1 | 10/2004 | Chadwick et al. | |
| 2005/0050150 A1 * | 3/2005 | Dinkin | 709/207 |
| 2005/0108340 A1 | 5/2005 | Gleeson et al. | |
| 2005/0120090 A1 | 6/2005 | Kamiya | |
| 2005/0204005 A1 | 9/2005 | Purcell et al. | |
| 2006/0010242 A1 | 1/2006 | Whitney et al. | |
| 2006/0031307 A1 * | 2/2006 | Bhatia | 709/206 |
| 2006/0095966 A1 | 5/2006 | Park | |
| 2006/0129644 A1 * | 6/2006 | Owen et al. | 709/206 |
| 2006/0168032 A1 | 7/2006 | Cai et al. | |
| 2007/0011323 A1 | 1/2007 | Gaal | |

FOREIGN PATENT DOCUMENTS

| | | |
|---|---|---|
| CN | 1196103(A) | 10/1998 |
| CN | 1403965 A | 3/2003 |
| CN | 1185595 A | 1/2005 |
| CN | 1185595(A) | 1/2005 |
| CN | 1592229 | 3/2005 |
| CN | 1619538 A | 5/2005 |
| CN | 1619538(A) | 5/2005 |
| CN | 1639768 A | 7/2005 |
| CN | 1639768(A) | 7/2005 |
| JP | 11015756 | 1/1999 |
| JP | 2003067304 | 3/2003 |
| WO | WO9956224 A1 | 11/1999 |
| WO | WO9956224(A1) | 11/1999 |

OTHER PUBLICATIONS

"Bayesian Spam Filtering", Wikipedia, Oct. 15, 2006, retrieved from the internet at http://en.wikipedia.org/w/index.php?title=Bayesian_spam_filtering&oldid=81604777, retrieved on Dec. 9, 2011, 4 pgs.

The Extended European Search Report mailed Dec. 21, 2011 for European patent application No. 07816955.4, 6 pages.

Robinson, "A Statistical Approach to the Spam Problem", Linux Journal, vol. 2003, No. 107, Mar. 1, 2003, 8 pgs.

Sahami, et al., "A Bayesian Approach to Filtering Junk E-Mail", AAAI Workshop on Learning for Text Categorization, Jul. 1, 1998, 8 pgs.

Japanese Office Action mailed Jan. 27, 2012 for Japanese patent application No. 2009-532672, a counterpart foreign application of U.S. Appl. No. 12/445,574, 11 pages.

The Japanese Office Action mailed May 18, 2012 for Japanese patent application No. 2009-532672, a counterpart foreign application of U.S. Appl. No. 12/445,574, 6 pages.

* cited by examiner

METHOD AND SYSTEM FOR DETERMINING JUNK INFORMATION

This application claims priority from Chinese patent application, Application No. 200610152807.2, filed in Chinese Patent Office on Oct. 18, 2006, entitled "METHOD AND SYSTEM FOR DETERMINING JUNK INFORMATION", and incorporates the Chinese patent application in its entirety by reference.

TECHNICAL FIELD

The present invention relates to information filtering technologies, and particularly to methods and systems for determining junk information.

BACKGROUND ART

More and more users send and receive a large volume of information through network, and are fully exploring the Internet for information exchange and resource sharing. However, the information usually contains a vast amount of junk information, which is not only of no value to the users, but can also be maliciously batch distributed with illegal purposes. The most commonly seen junk information is junk emails. A user may receive advertisements, propaganda of illegal activities and even viruses in his/her email account. These junk mails occupy a large amount of network resources, and induce a great pressure on servers and network data flow. Furthermore, certain illegal information may become serious potential safety problems of the network.

In response to these circumstances, current websites normally have filtering functions for junk mails, and adopt various kinds of anti-spam methods to avoid distribution of junk information. Such methods include those that index the information content distributed by users, deploy irregular time delay, use manual inspection, or use keyword filtering. Of these methods, the keyword filtering method is most intelligent and efficient. Herein, keywords refer to keywords in junk information, such as words, phrases or word groups that appear frequently in junk information and are representative of the junk information. In keyword filtering, a common practice is to pre-define a certain number of keywords for junk information. When a user distributes information over the Internet, a system scans the information, and determines, based on the keywords and various rules, whether any predefined junk information exists in the information. If exists, the information is not allowed to be distributed, or treated as junk information for processing. The user who attempts to distribute such information may even be put in a black list. The keyword filtering method can recognize junk mails automatically, and is most often used for filtering junk mails.

A crucial factor in existing information filtering is how to pre-define junk information reasonably. If reasonably defined, junk information can be correctly recognized from a massive amount of information. If defined improperly, filtering may have poor efficiency. A common practice is to perform selection based on experience or from information that has been identified as junk information, and manually pre-define certain keywords to be contents of junk information. Although this approach may filter junk information, keywords determined based upon human factors have certain randomness, and filtering result thus obtained may have a large error rate. For example, this approach may fail to recognize junk information that is not within the scope of the keywords or junk information in which occurrence rates of the keywords are low. Moreover, the approach may mistaken certain information that is not junk information but has some characteristics of junk information to be junk information.

DESCRIPTION OF THE INVENTION

The present invention provides a method and a system for determining junk information to solve the technical problem of improperly predefined junk information. By rationally determining junk information contents, efficiency of information filtering can be improved.

To solve the aforementioned technical problem, the present invention provides a method for determining junk information. The method includes:

pre-defining junk information keywords in data samples;

computing keyword scores for each of the keywords;

simulating filtering of the data samples using the keyword scores to obtain a filtering index value;

determining whether the filtering index value satisfies an evaluation index, if not satisfied, revising the keywords or the keyword scores and repeating the simulating to obtain a new filtering index value; and if satisfied, terminating the revising.

In the method, the revising step may include adding new keywords, and re-computing the keyword scores; or manually revising the scores for the original keywords.

Simulating filtering of the data samples may include:

for each sample, computing a probability that the data sample is junk information using the keyword scores;

for each sample, comparing the probability with a predefined junk threshold, determining that the data sample is junk information if the probability is greater than or equal to the junk threshold; and obtaining the filtering index value of the data samples based on results from the determining.

Preferably, a total probability formula is used to compute the probability that the data sample is junk information, and Bayesian algorithm is used for computing the keyword scores.

Preferably, junk information keywords are pre-defined based on various application requirements such that different junk information keywords are used for different applications.

The present invention further provides a system for determining junk information. The system includes:

a storage unit, used for storing junk information keywords and keyword scores of data samples;

a simulation statistics unit, used for computing the keyword scores for each keyword, and for simulating filtering of the data samples using the keyword scores to obtain a filtering index value; and a revising unit, used for determining whether the filtering index value satisfies an evaluation index, if not satisfied, revising the keywords or the keyword scores and triggering the simulation statistics unit, and if satisfied, terminating the revising.

The revising unit may perform the following revising procedures: adding new keywords, and triggering the simulation statistics unit for re-computing the keyword scores; or manually revising the scores for the original keywords.

Preferably, the storage unit stores different junk information keywords and different keyword scores based on various application requirements.

Compared with existing technologies, the present invention may have the following advantages.

First, the method computes a filtering index value of data samples using simulation, and compares it with an evaluation index to reiteratively revise keywords and keyword scores and determines whether the pre-defined keywords and corresponding keyword scores are reasonable. The disclosed method can help a user define junk information keywords and keyword scores scientifically, and determine whether information is junk information using the keywords and corresponding scores, thereby improving efficiency of information filtering. In a system for junk information processing, high efficiency indexes may be attained using the junk information defined by the disclosed method.

Furthermore, a user may freely define junk information keywords and scores based on various requirements. Therefore, the disclosed method of the present invention can be widely used in a variety of applications and systems such as feedback systems, guestbook systems, forums and junk mail processing. Moreover, the achieved efficiency of information filtering can be suitably applied to a user's own operation domain.

In addition, the disclosed method of the present invention uses a total probability formula to compute junk information probability based on pre-defined keywords and corresponding scores, and therefore improves the accuracy of junk information recognition and the efficiency of information filtering.

EXEMPLARY EMBODIMENTS

In order to better understand the aforementioned goals, characteristics and advantages of the present invention, the present invention is described in further detail using accompanying figures and exemplary embodiments.

The core concept of the present invention is to let user select representative information to be sample junk information and define keyword(s) for the junk information. The system computes over the sample junk information to obtain keyword scores, and performs simulation using the keyword scores to obtain a filtering index value. Through comparing the filtering index value with an evaluation index, the keywords and the keyword scores are reiteratively revised and optimized until reasonable junk information keywords and keyword scores are obtained.

The junk information may be information having certain common characteristics, e.g., malice mass advertisements, illegal activity participation or sales of illegal products, and other characteristics which are defined by user based on application requirements. In this disclosure, the meaning of junk information is broader. Any information that does not satisfy browsing needs of a user is considered to be junk information. For example, if advertising information for vehicles appears in a web page introducing music, the advertising information will be considered to be junk information. A score for junk information keyword is a value assigned to the keyword when the junk information keyword is defined in the technical scheme of this disclosure. This score is a quantified fraction value indicative of how greater the probability for the keyword to appear in junk information is than the probability for the keyword to appear in normal information.

In the process of information filtering, the disclosed method of the present invention is used to determine whether pre-defined keywords and corresponding scores are reasonable, and to accurately determine whether online distributed information is junk information based on keyword filtering approach.

Figure 1:
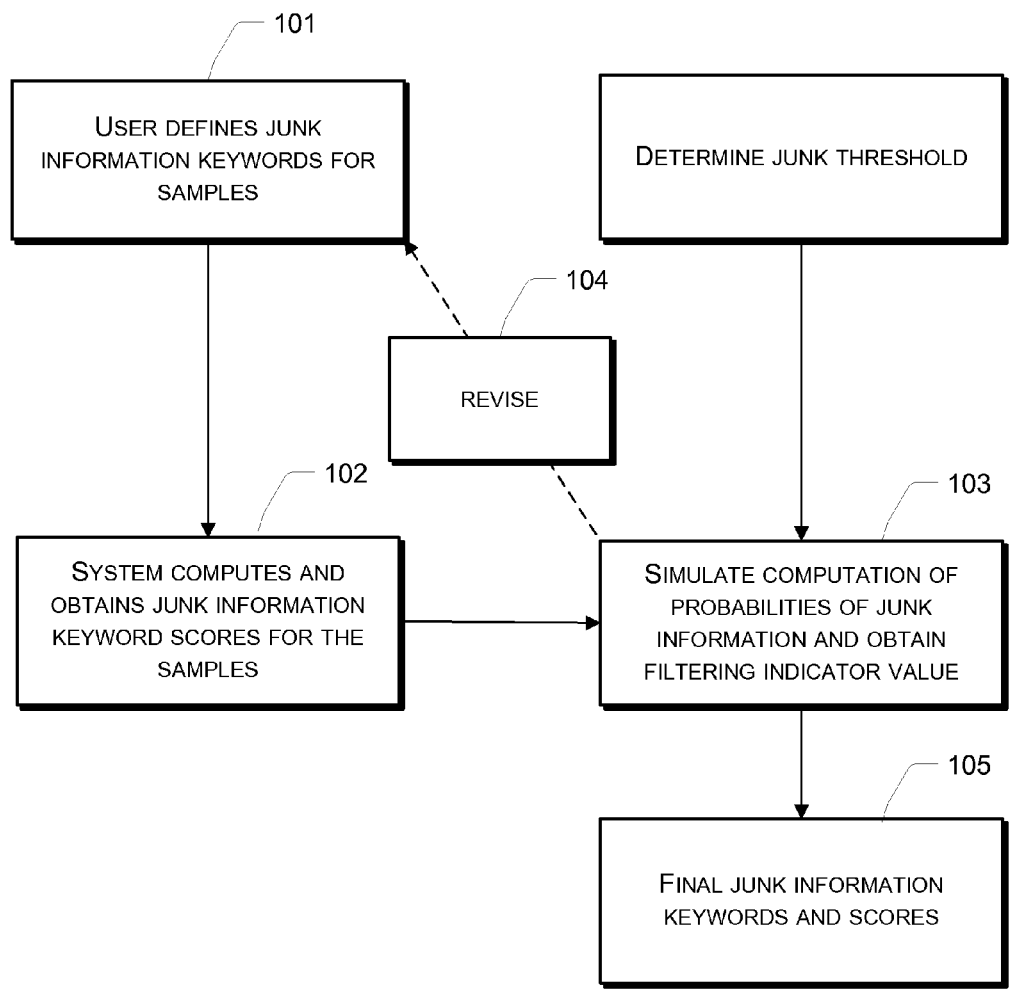
FIG. 1 shows a schematic diagram illustrating a process of rationally determining junk information in accordance with the present invention.

FIG. 1 shows a schematic diagram illustrating a process of rationally determining junk information in accordance with the present invention. Through simulating a filtering process for junk information, the method repeatedly optimizes pre-defined keywords and keyword scores, thus making it possible to scientifically define junk information keywords and respective scores.

At Block 101, a user selects data samples, and defines junk information keywords of the data samples. Generally, a user selects representative data of his/her operation domain to be samples, and from these data samples, selects words, phrases or word groups that may be indicative of junk information to be junk information keywords.

At Block 102, a system computes a score for each keyword in the samples to obtain junk information keyword scores. A common approach used to determine a keyword score is Bayesian algorithm. Since this algorithm has obtained excellent filtering efficiency in junk mail processing while other designs for keyword scoring have high degrees of randomness, Bayesian algorithm is preferably adopted in this disclosure for computing junk information keyword scores.

At Block 103, probabilities of junk information in the samples are simulated and computed to obtain a filtering index value. Upon obtaining the keyword scores, the system computes probabilities of each data sample being junk information based on the scores, and compares the probabilities with a junk threshold which is determined by the user. A data sample is determined to be junk information if its junk info probability is greater than or equal to the threshold. The junk threshold is a standard score defined by the user for determining whether information is junk.

After all the data samples are processed accordingly, the samples are categorized into junk information and non junk information in manners used in a filtering simulation. In order to examine information filtering efficiency, the user defines one or more evaluation indexes for his/her operation domain. Filtering index values corresponding to each evaluation index are then computed from filtering result of the samples.

At Block 104, the computed filtering index values are compared with corresponding evaluation indexes defined by the user. If the comparison result is satisfactory, the junk information keywords and the keyword scores selected by the user are deemed reasonable and capable for accurately filtering junk information. If the filtering index values do not satisfy the corresponding evaluation indexes, information filtering may have poor efficiency, the keywords and the keyword scores need to be revised, and the filtering simulation of the data samples needs to be re-done. This process of optimization is repeated until the filtering index values computed from the simulation satisfy the evaluation indexes.

Based on specific results of simulation, the user may add new keyword(s) or remove the original keyword(s) for keyword revision. Alternatively, the user may revise the keyword score(s) without changing the originally defined keywords. With keyword addition, the system re-computes keyword scores according to the above method, and re-filters the data samples to obtain the filtering index values. With keyword score revision, the scores are generally modified manually, and the data samples are filtered again to obtain the filtering index values.

At Block 105, optimized keywords and keyword scores are obtained through the above process of repeated revisions, and are determined to be keywords and the corresponding keyword scores for filtering junk information. If information filtering is performed on data in the same operation domain as that of the samples, these keywords and keyword scores can be used directly for filtering.

Based on the foregoing principles, the disclosed method of the present invention can help a user scientifically define junk information keywords and keyword scores, and determine whether information is junk information based on the keywords and corresponding keyword scores, thereby improving efficiency of information filtering. In a system for junk information processing, high efficiency indexes may be attained using the junk information defined by the disclosed method.

Because of the broader definition of junk information in the present invention, a user may define different junk information keywords and scores based on various requirements. Therefore, the disclosed method of the present invention can be widely used in a variety of applications and systems such as feedback systems, guestbook systems, forums, and junk mail processing. Moreover, the achieved efficiency of information filtering can be suitably applied to a user's own operation domain. Though anti-spam methods have been widely adopted for processing junk mails currently, only a few applications are specific for processing feedback messages. The disclosed method of the present invention, however, can effectively solve the problem of junk message filtering. An example of processing junk messages is used below to illustrate how reasonable keywords and keyword scores for junk information are determined.

Figure 2:
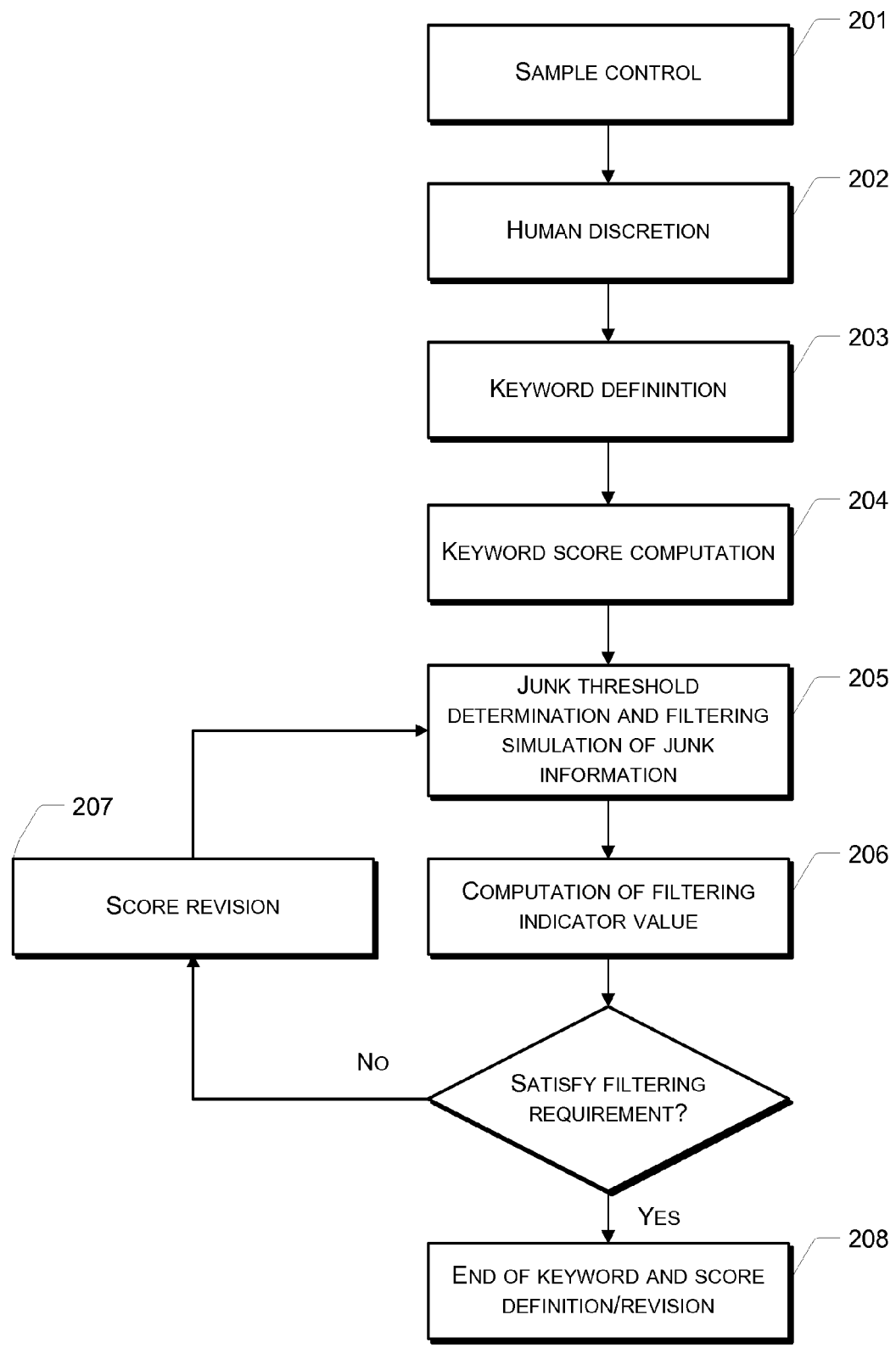
FIG. 2 shows a flow chart illustrating an exemplary process of rationally determining junk information in accordance with the present invention.

FIG. 2 shows a flow chart illustrating an exemplary process of rationally determining junk information in accordance with the present invention.

Block 201—Sample Control: A system selects messages delivered within a certain period of time to be data samples. For example, messages received within a quarter of a year may be selected to be data samples. During sampling, information that may interfere with data computation is removed through human recognition in order to have more precise samples.

Block 202—Human Discretion: The selected data samples are manually identified into normal information and junk information. For messages or mails, discretion is generally made for each piece of information. For lengthy information, the information may be divided into several units which are then discriminated.

Block 203—Keyword Definition: Based on the above message data, user defines a series of junk information keywords such as "bill", "gun", and "body organ". The keywords may be manually defined based on requirements of the user's own operation domain, or selected from information which has been identified as junk information.

Block 204—Keyword Score Computation: Bayesian algorithm is used to compute scores for the defined junk information keywords in the samples. For example, computed scores of "bill" and "gun" may be 0.75 and 0.9, respectively. Bayesian algorithm is a probability-based algorithm, and is invented by Thomas Bayes, a well-known mathematician. This algorithm has currently received widespread acclamation in junk mail filtering applications. A Bayesian filter is a self-learning based intelligent technology, and can allow the filter to self-adapt for new tricks of spammers while providing protection to legitimate emails. The Bayesian filtering technology has achieved a greater success in intelligent mail filtering technologies, and is increasingly adopted in anti-spam products. A computing process of the Bayesian algorithm is shown below.

First, the number of occurrences of the junk information keywords in normal information and the number of occurrences of the junk information keywords in junk information are separately computed. For example, for a keyword A defined in the sample messages, Na represents frequency (i.e., number of occurrences) of A in normal messages, and Sa represents frequency of A in junk messages. A method for counting method may include: counting the number of times A appears in a message (e.g., record one count if the keyword A appears once in the message, record two counts if the keyword A appears twice, and so on); searching all the messages, and summing up the respective counts for each message to obtain the frequencies of the keyword A in the normal messages and in the junk messages.

Second, keyword scores are computed. Based on the frequencies of occurrences in the two data types (i.e., normal messages and junk messages), the system computes a probability that the information containing the present junk keyword is junk information. For the above keyword A, intermediate variables $P1a$ and $P2a$ are set, where $P1a=Na$/a record count of the keywords in all the normal messages $P2a=Sa$/a record count of the keywords in all the junk messages Therefore, the probability that the message having the keyword A is junk information is: $Pa=(P2a)/(P1a+P2a)$.

The above Pa is the keyword score obtained from the computation. In the above formula, the record count of the keywords refers to the sum of the frequencies of all keywords.

Block 205—Junk Threshold Determination and Filtering Simulation of Junk Information: The user initially determines a junk threshold F for determining junk information according to his/her operation domain. The system then determines and identifies junk information from the data samples based on keyword filtering rules. Each message is processed as follows.

First, for each defined junk information keyword, determine if the junk information keyword appears in the message's. A method of determination is described as follows: Let Ki be a loop variable for keywords, and Vi be a variable for the score corresponding to the keyword. If Ki appears in the message, Ki and corresponding Vi are recorded, and are identified as KA(i) and VA (i). If Ki does not appear in the message, another keyword is examined. After completing a loop, two tables having the same length, namely a keyword table KA and a score table VA, are obtained. The content of the message may be segmented for matching the keywords. Moreover, keyword combinations are preferably matched first, and then regular keywords. Examples of the keyword combinations include "body"+"organ", while an example of regular keywords is "gun".

Second, the length of KA is determined. If the length of KA is smaller than one, this indicates that no defined junk keyword exists in the present message, and return indicates a normal information type. If the length of KA is greater than zero, this implies that at least one junk keyword appears in the present message. Probability that the present message is junk information, i.e., junk probability P, is then computed. Any methods, such as averaging, that are known by one skilled in the art may be used to compute the junk probability P. In the present invention a total probability formula, which can improve the accuracy of junk information recognition and increase the information filtering efficiency, is preferably used for computing the junk probability P.

In order to obtain a probability of a complicated event, the complicated event is generally decomposed into a number of mutually exclusive simple events. Using conditional probabilities and multiplications, probabilities of the simple events are obtained, from which a final result is obtained using additivity of probabilities. This approach is commonly called "total probability formula".

Therefore, using Bayesian algorithm with total probability formula, $$P=(VA1 \times VA2 \times VA3 \times \ldots \times VAi)/(VA1 \times VA2 \times VA3 \times \ldots \times VAi+(1-VA1) \times (1-VA2) \times (1-VA3) \times \ldots \times (1-VAi))$$

The computed value of P is the message's junk score measured over the samples.

Third, the junk score and the junk threshold are compared. If P is greater than or equal to F, the present information is deemed a junk message, and is set to be junk information determined by simulation. Otherwise, the present message is set to be normal information determined by simulation.

Block 206—Computation of Filtering Index value: In the process of information filtering, two evaluation indexes, recall rate and false-positive Rate, are generally used for checking effectiveness of the information filtering. The recall rate represents percentage of junk information that has been correctly filtered by the system out of all the junk information. The false-positive rate represents percentage of normal messages, out of all the messages, that have been falsely determined by the system to be junk messages. According to the evaluation indexes, recall rate and false-positive rate are computed from the filtering result of the data samples. Computational formulas are shown as follows:

$$\text{Recall rate} = \text{number of junk messages that are correctly recalled/total number of junk messages}$$

$$= \frac{\begin{pmatrix} \text{number of messages that are determined to be} \\ \text{junk messages by system} - \text{number of messages} \\ \text{that are determined to be junk messages by} \\ \text{system but not by human} \end{pmatrix}}{\begin{pmatrix} \text{number of messages that are determined to be} \\ \text{junk messages by human} \end{pmatrix}};$$

$$\text{False-positive rate} = \text{number of messages that are falsely recalled/total number of messages or samples}$$

$$= \frac{\begin{pmatrix} \text{number of messages that are determined} \\ \text{to be junk messages by system} - \text{number of} \\ \text{messages that are determined to be junk} \\ \text{messages both by system and by human} \end{pmatrix}}{\text{total number of messages or samples}}$$

In the above formulas, "by human" refers to the manual identification of normal information and junk information in Block 202. Block 202 is involved in the system's simulation of filtering index values. After obtaining the filtering index values of the samples, the filtering index values are compared with the evaluation indexes that have been defined by the user. If the filtering index values satisfy requirements for the specific environment, e.g., false-positive rate is smaller than 0.1%, and recall rate is greater than 90%, the keywords, the keyword scores and the junk threshold created in the disclosed method can be kept for applications. Otherwise, the process continues to Block 207 for further revising.

At Block 207, based on the simulation result, the keywords are revised according to the above-described method. The system then computes keyword scores for new keywords. Alternatively, the scores for the original keywords are directly revised according to human discretion. After revising the keywords and the keyword scores, the process returns to Block 205 for simulating the filtering index values again. Generally, only revision of keywords or manual revision of keyword scores are needed for rationally determining junk information keywords and scores. Under less common circumstances, the junk threshold may also needed to be revised.

At Block 208, through the repeated revising in the above blocks, optimized keywords and keyword scores are obtained. Using these keywords and keyword score for processing junk information having a large data volume, high efficiency filtering index can be attained, thus making junk information filtering possible in actual applications.

Figure 3:
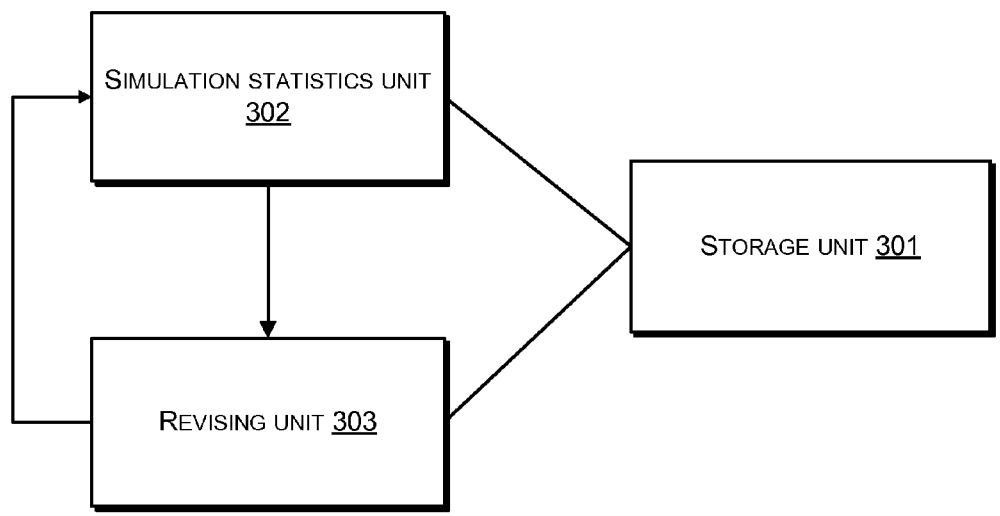
FIG. 3 shows a structural diagram of a system for rationally determining junk information in accordance with the present invention.

In order to realize the above method, the present invention further provides a system for determining junk information. FIG. 3 shows a structural diagram of the system. The system includes a storage unit 301, a simulation statistics unit 302, and a revising unit 303.

The storage unit 301 is used for storing junk information keywords that are defined by a user. The storage unit 301 also stores the corresponding keyword scores that have been finally determined through computing and revising. The revised keywords and keyword scores in the storage unit 301 are used in information filtering method based on keywords.

The simulation statistics unit 302 is used for reading the junk information keywords of data samples in the storage unit 301, and computing the keyword scores using the Bayesian algorithm. The simulation statistics unit 302 then simulates the filtering of the data samples using the keywords and the keyword scores. Each data sample is simulated to determine whether the keywords exist, and probabilities that the data sample is junk information are computed for each data sample using the Bayesian algorithm with the total probability formula. If the probability is greater than or equal to a pre-defined junk threshold, corresponding data sample is deemed junk information. After simulating the filtering of the data samples into normal information and junk information, a filtering index value is simulated for examining validity of information filtering according to a pre-defined evaluation index.

The revising unit 303 is used for comparing the filtering index value obtained by the simulation statistics unit 302 from the data samples with the evaluation index. If the value satisfies the evaluation index, this indicates that the pre-defined keywords and keyword scores are reasonable and can be used for filtering junk information. If not satisfied, revision is required to re-determine reasonable keywords and keyword scores. Based on different simulation conditions, the revising unit 303 may revise the keywords, and ease the simulation statistics unit 302 to re-compute keyword scores for new keywords and re-simulate computation of filtering index value. Alternatively, the original keyword scores may be modified without revising the keywords, in which the keyword scores may be finely adjusted manually, and the simulation statistics unit 302 then re-simulates the computation of filtering index value. Through reiterated optimization, the revising unit 303 can help a user scientifically define junk information keywords and keyword scores, thereby improving efficiency of information filtering, and attaining high efficiency filtering index in a system for junk information processing.

In the above system, a user may freely define junk information keywords and scores based on various requirements. Therefore, the disclosed system can be widely used in a variety of applications and systems, and suitably applied to the user's operation domain with desired efficiency of information. The disclosed system can effectively handle the problems of filtering such information as junk messages and junk mails particularly well in areas such as mails, messages and forums that require more anti-spam.

A method and a system for determining junk information provided by the present invention have been described in details above. Exemplary embodiments are employed to illustrate the concept and implementation of the present invention in this disclosure. The exemplary embodiments are only used for better understanding of the method and core concepts of the present invention. Based on the concepts of this invention, a person of ordinary skills in the art may make modifications to the practical implementation and application areas. In conclusion, the content of this description should not be interpreted as limitations to the present invention.

The invention claimed is:

1. A method for determining junk information, the method comprising:
   pre-defining junk information keywords in data samples;
   computing keyword scores for each of the keywords;
   filtering each of the data samples into either a junk information category or a non-junk information category based at least on the keyword scores;
   obtaining a current filter index value that is indicative of at least one of a false-positive filter rate for the data samples erroneously filtered into the junk information category and a true-positive filter rate for the data samples correctly filtered into the junk information category;
   determining whether the filter index value satisfies an evaluation index, and if not satisfied, revising the keywords or the keyword scores and repeating the filtering of the data samples and the obtaining a current filter index value; and
   if satisfied, storing at least one of the keywords or the keyword scores.

2. A method as recited in claim 1, wherein the revising the keywords or the keyword scores comprises:
   adding new keywords and re-computing the keyword scores.

3. A method as recited in claim 1, wherein the revising the keywords or the keyword scores comprises:
   manually revising the scores of the original keywords.

4. A method as recited in claim 1, wherein the filtering each of the data samples comprises:
   for each data sample, computing a probability that the data sample is junk information using the keyword scores;
   for each data sample, comparing the probability with a pre-defined junk threshold, and determining that the data sample is junk information if the probability is greater than or equal to the junk threshold.

5. A method as recited in claim 4, wherein the computing the probability that the data sample is junk information is done based at least on a total probability formula.

6. A method as recited in claim 1, wherein a Bayesian algorithm is used for computing the keyword scores.

7. A method as recited in claim 1, wherein the junk information keywords are pre-defined based on an application requirement and can be different for different application requirements.

8. A method as recited in claim 1, wherein each of the data samples is manually identified by at least one human as being either junk information or a non-junk information, wherein the current filter index is indicative of the true-positive rate, and wherein the obtaining a current filter index that is indicative of at least one of a false-positive filter rate for the data samples erroneously filtered into the junk information category and a true-positive filter rate for the data samples correctly filtered into the junk information category comprises:
   determining a first number, the first number being how many of the data samples filtered into the junk information category were correctly filtered therein based at least on the data samples manually identified by a human as being junk information; and
   dividing the first number by a second number to obtain the true-positive filter rate, the second number being how many of the data samples were manually identified by at least one human as being junk information.

9. A method as recited in claim 1, wherein each of the data samples is manually identified by at least one human as being either junk information or a non-junk information, wherein the current filter index is indicative of the false-positive rate, and wherein the obtaining a current filter index that is indicative of at least one of a false-positive filter rate for the data samples erroneously filtered into the junk information category and a true-positive filter rate for the data samples correctly filtered into the junk information category comprises:
   determining a first number, the first number being how many of the data samples filtered into the junk information category were erroneously filtered therein based at least on the data samples manually identified by a human as being junk information; and
   dividing the first number by a total of the data samples to obtain the false-positive filter rate.

10. A method as recited in claim 1, wherein each of the data samples is manually identified by at least one human as being either junk information or a non-junk information, wherein the current filter index is indicative of both true-positive rate and the false-positive rate, and wherein the obtaining a current filter index that is indicative of at least one of a false-positive filter rate for the data samples erroneously filtered into the junk information category and a true-positive filter rate for the data samples correctly filtered into the junk information category comprises:
   determining a first number, the first number being how many of the data samples filtered into the junk information category were correctly filtered therein based at least on the data samples manually identified by a human as being junk information;
   dividing the first number by a second number to obtain the true-positive filter rate, the second number being how many of the data samples were manually identified by at least one human as being junk information;
   determining a third number, the third number being how many of the data samples filtered into the junk information category were erroneously filtered therein based at least on the data samples manually identified by a human as being junk information; and
   dividing the third number by a total of the data samples to obtain the false-positive filter rate.

11. A system for determining junk information, characterized in that the system comprises:
   a storage unit that stores junk information keywords and keyword scores of data samples;
   a statistics unit that computes the keyword scores for each keyword, filters each of the data samples into either a junk information category or a non-junk information category based at least on the keyword scores, and obtains a current filter index value that is indicative of at least one of a false-positive filter rate for the data samples erroneously filtered into the junk information category and a true-positive filter rate for the data samples correctly filtered into the junk information category;

a revising unit that determines whether the filter index value satisfies an evaluation index, if not satisfied, the revising unit revises the keywords or the keyword scores and triggers the statistics unit, and if satisfied, the revising unit stores at least one of the keywords or the keyword scores in the storage unit.

12. A system as recited in claim 11,
wherein the revising unit is configured to add new keywords and wherein the statistics unit re-computes the keyword scores upon being triggered.

13. A system as recited in claim 11, wherein the storage unit stores different junk information keywords and different keyword scores for various application requirements.

14. A system as recited in claim 11, wherein each of the data samples is manually identified by at least one human as being either junk information or a non-junk information, wherein the current filter index is indicative of the true-positive rate, and wherein the statistics unit obtains a current filter index that is indicative of at least one of a false-positive filter rate for the data samples erroneously filtered into the junk information category and a true-positive filter rate for the data samples correctly filtered into the junk information category by:

determining a first number, the first number being how many of the data samples filtered into the junk information category were correctly filtered therein based at least on the data samples manually identified by a human as being junk information; and dividing the first number by a second number to obtain the true-positive filter rate, the second number being how many of the data samples were manually identified by at least one human as being junk information.

15. A system as recited in claim 11, wherein each of the data samples is manually identified by at least one human as being either junk information or a non-junk information, wherein the current filter index is indicative of the false-positive rate, and wherein the statistics unit obtains a current filter index that is indicative of at least one of a false-positive filter rate for the data samples erroneously filtered into the junk information category and a true-positive filter rate for the data samples correctly filtered into the junk information category by:

determining a first number, the first number being how many of the data samples filtered into the junk information category were erroneously filtered therein based at least on the data samples manually identified by a human as being junk information; and dividing the first number by a total of the data samples to obtain the false-positive filter rate.

16. A system as recited in claim 11, wherein each of the data samples is manually identified by at least one human as being either junk information or a non-junk information, wherein the current filter index is indicative of both the true-positive rate and the false-positive rate, and wherein the statistics unit obtains a current filter index that is indicative of at least one of a false-positive filter rate for the data samples erroneously filtered into the junk information category and a true-positive filter rate for the data samples correctly filtered into the junk information category by:

determining a first number, the first number being how many of the data samples filtered into the junk information category were correctly filtered therein based at least on the data samples manually identified by a human as being junk information;

dividing the first number by a second number to obtain the true-positive filter rate, the second number being how many of the data samples were manually identified by at least one human as being junk information;

determining a third number, the third number being how many of the data samples filtered into the junk information category were erroneously filtered therein based at least on the data samples manually identified by a human as being junk information; and dividing the third number by a total of the data samples to obtain the false-positive filter rate.

17. A method for determining junk information, the method-comprising:

filtering each data sample of the plurality of data samples into either a junk information category or a non-junk information category based at least on computed keyword scores for a keywords contained in a plurality of data samples;

obtaining a current filter index value that is indicative of at least one of a false-positive filter rate for the data samples erroneously filtered into the junk information category and a true-positive filter rate for the data samples correctly filtered into the junk information category;

determining whether the filter index value satisfies an evaluation index, and if not satisfied, revising the keywords or the keyword scores and repeating the filtering of the data samples and the obtaining a current filter index value; and if satisfied, storing at least one of the keywords or the keyword scores.

18. A method as recited in claim 17, further comprising:
adding new keywords and re-computing the keyword scores.

19. A method as recited in claim 18, wherein the revising the keywords or the keyword scores comprises:
manually revising the scores of the original keywords.

* * * * *